US006410175B1

(12) United States Patent
Tillmetz et al.

(10) Patent No.: US 6,410,175 B1
(45) Date of Patent: Jun. 25, 2002

(54) FUEL CELL SYSTEM WITH IMPROVED STARTING CAPABILITY

(75) Inventors: Werner Tillmetz, Lindau (DE); David P. Wilkinson; Kevin M. Colbow, both of North Vancouver (CA); Jean St.-Pierre, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/191,049

(22) Filed: Nov. 12, 1998

(51) Int. Cl.$^7$ .............................................. H01M 08/00
(52) U.S. Cl. ............................ 429/13; 429/17; 429/30
(58) Field of Search ............................. 429/13, 17, 22, 429/23, 27, 19, 21, 30

(56) References Cited

U.S. PATENT DOCUMENTS

| | | | |
|---|---|---|---|
| 5,200,278 A | 4/1993 | Watkins et al. ............... 429/24 |
| 5,413,878 A | * 5/1995 | Williams et al. .............. 429/16 |
| 5,482,790 A | 1/1996 | Yamada et al. ................ 429/9 |
| 5,527,632 A | 6/1996 | Gardner ........................ 429/27 |
| 5,646,852 A | * 7/1997 | Lorenz et al. ......... 364/431.051 |
| 5,794,732 A | 8/1998 | Lorenz et al. ............. 180/65.3 |
| 5,879,826 A | * 3/1999 | Lehman et al. ............... 429/13 |
| 5,945,229 A | * 8/1999 | Meltser ........................ 429/13 |
| 6,063,515 A | * 5/2000 | Epp et al. ..................... 429/17 |
| 6,329,089 B1 | * 12/2001 | Roberts et al. ............... 429/13 |

FOREIGN PATENT DOCUMENTS

| EP | 0 729 196 A1 | 8/1996 |
| JP | 08-022834 | 1/1996 |
| WO | WO 94/02409 | 2/1994 |

OTHER PUBLICATIONS

Katsuji, et al., JP 05–307970, JAPIO and Derwent database information, Nov. 19, 1993.
Shuichi, JP 07–169490 JAPIO database information, Jul. 4, 1995.
JP 07–320763, Derwent database information, Dec. 8, 1995.
JP 09–035734, Derwent database information, Feb. 7, 1997.
Scott, "Hydrogen fuel ready for bus fleet," *Automot. Eng.* 86(5):78–81 (1978)—database information provided by NERAC search services.
No Author, "Gasoline may provide interim power for fuel cells," *Automotive News*, p. 41—Jan. 29, 1996—database information provided by NERAC search services.
Amphlett, et al., "Some Design considerations for a Catalytic Methanol Steam Reformer for a PEM Fuel Cell Power Generating System," *Proceeding of the 26th Intersociety Energy conversion Engineering Conference*, 3(26):642–649 (1991).

* cited by examiner

*Primary Examiner*—Gabrielle Brouillette
*Assistant Examiner*—R. Alejandro
(74) *Attorney, Agent, or Firm*—McAndrews, Held & Malloy, Ltd.

(57) ABSTRACT

A method of commencing operation of a fuel cell system which includes a fuel reformer is provided. During a start-up period, the same fuel which is used in the feedstock to the reformer is directed to at least a portion of the fuel cells in the system. These fuel cells provide output power by direct oxidation of the fuel, at least until the reformer is operational, producing a hydrogen-containing gas stream suitable for the fuel cells. Thus, useful output power can be obtained from the system without the delay typically associated with start-up of the reformer.

38 Claims, 4 Drawing Sheets

FUEL CELL SYSTEM WITH IMPROVED STARTING CAPABILITY

FIELD OF THE INVENTION

The present invention relates to methods and apparatus for commencing operation of a solid polymer fuel cell system. In particular, the invention relates to starting fuel cell systems that include a reformer.

BACKGROUND OF THE INVENTION

Fuel cell systems are currently being developed for use as power supplies in numerous applications, such as transportation applications and stationary power plants. In some of these applications, the fuel cell system may operate more or less continuously for long periods, albeit at varying power levels. However, in other applications, the fuel cell system may be subjected to frequent on-off cycles and hence go through numerous starts from a shutdown condition. Automotive applications are an example of applications with such a duty cycle.

In general, electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst is needed to induce the desired electrochemical reactions at the electrodes. In addition to electrocatalyst, the electrodes may also comprise an electrically conductive substrate upon which the electrocatalyst is deposited. Solid polymer electrolyte fuel cells employ a membrane electrode assembly ("MEA"). The MEA comprises a solid polymer electrolyte or ion-exchange membrane disposed between the two electrode layers. Solid polymer fuel cells operate at relatively low temperatures (circa 80° C.) compared to other fuel cell types.

A broad range of reactants can be used in electrochemical fuel cells. The oxidant is typically oxygen, delivered in a substantially pure oxygen stream or in a dilute oxygen stream such as air. The fuel is often molecular hydrogen, delivered as substantially pure hydrogen gas or in a hydrogen-containing gas stream such as a reformate stream. Other fuels, besides molecular hydrogen, may be oxidized directly at the fuel cell anode. For example, methanol, dimethyl ether, and methane may be delivered to the fuel cell anode where they are oxidized to produce protons. Such fuels may be delivered in gaseous streams. For methanol and dimethyl ether however, aqueous liquid streams are more commonly used.

A given solid polymer fuel cell can be expected to operate to some extent on most fuels, either in the gas phase or liquid phase, and therefore provide power. However, the design and operation of a solid polymer fuel cell system is typically adapted for the specific type of fuel stream (both the fuel and phase) which is to be used. Along with differences in the subsystems external to the fuel cells (e.g., fuel circulation, cooling, and/or humidification subsystems), there may also be differences in the fuel cells themselves. At this time, for instance, the anodes in direct methanol liquid feed fuel cells (i.e., cells which operate "directly" on unreformed aqueous methanol) typically employ different electrocatalysts and different electrode structures than do fuel cells supplied with hydrogen gas. Another difference between hydrogen gas and direct methanol liquid feed fuel cells might be the choice of solid polymer membrane. In direct methanol liquid feed fuel cells, there is often a problem with crossover of methanol fuel from the anode to the cathode side through the membrane. Improvements in crossover characteristics of membrane materials can be expected to lead to different membranes being preferred for each fuel cell type.

Hydrogen gas is presently a preferred fuel insofar as fuel cell operation and performance (output power) are concerned. However, it can be significantly more difficult to store and handle hydrogen than other fuels. Accordingly, in many fuel cell systems, a hydrogen-containing gaseous fuel stream is created from another fuel using a fuel processing subsystem. Typically, the fuel processing subsystem includes a reformer which generates a hydrogen-containing reformate stream from a fuel feedstock (such as methanol or natural gas), usually by reacting the fuel with steam at elevated temperature in the presence of a suitable catalyst. The fuel processing subsystem also typically includes various other components to assist the reforming process, to purify the reformate stream, and/or to introduce other desirable compounds into the gas stream (e.g., vaporizer, shift converter, selective oxidizer, hydrogen separator, humidifier, etc.).

While reformer-based fuel cell systems are preferred in some applications, there are some difficulties associated with the use of reformed fuel. For instance, aside from the need for and complexity of the fuel processing subsystem itself, it can be significantly more complicated and time consuming to start up the system. Both the solid polymer fuel cells and the reformer typically operate above ambient temperature and thus generally need to be heated before normal operation can begin. The reformer in particular may need to be heated to several hundred degrees Celsius and this can take several minutes to accomplish. Further, during warm-up, operation of the reformer is usually not as efficient and any reformate produced may contain large quantities of impurities such as carbon monoxide which can poison the electrocatalysts typically employed in fuel cell anodes. Thus, any reformate produced during the start-up period may not be of much use for purposes of generating electrical power from the fuel cells. Additionally, the power output of the fuel cells themselves may be relatively low until they have reached a certain operating temperature. Finally, any water supply used in the fuel processing subsystem or in humidification of the fuel cell reactant streams is subject to freezing when ambient conditions fall below 0° C., and thus represents an additional potential difficulty for system start-up. As a result, additional subsystems may be required to provide power and/or heat just during the start-up of a reformer-based fuel cell system. For instance, fuel from the fuel feedstock supply can be burned to heat up the reformer. Once the reformer is operating, hydrogen-containing reformate is available to start up the fuel cells. Also, the reformer may be used to heat the fuel cells. This procedure however may be undesirably slow for some applications. Alternatively, a supply of substantially pure hydrogen can be maintained in the system simply for start-up purposes. The hydrogen can be combusted (by burner or catalytic combustion) to provide heat for warming up the reformer and fuel cells. Hydrogen can also be directed to the fuel cell anodes to initiate operation of the fuel cells until a suitable supply of reformate is available. The supply of hydrogen can be stored, for example, as bottled compressed gas or absorbed in metal hydride compounds. However, the hydrogen supply must periodically be replenished. In another approach, reformer-based fuel cell systems can be started up using energy provided by storage batteries or using combinations of the preceding methods.

Direct methanol fuel cell systems (DMFCs) are not subject to the same problems relating to start-up. Direct methanol fuel cells show relatively good performance during the start-up phase and thus are capable of fairly rapid start-up and can provide some useful power output when starting from ambient temperatures. Further still, methanol has a freezing point that is well below the typical lower temperature limit to which the system is exposed in most applications. Thus, methanol and certain aqueous methanol mixtures may not pose a freezing concern (although typical aqueous methanol mixtures for DMFCs are too dilute to provide significant protection against freezing). However, at this time at least, the performance and efficiency of direct methanol fuel cells is not adequate to supplant reformer-based fuel cell systems in all applications.

SUMMARY OF THE INVENTION

A solid polymer fuel cell system which comprises a supply of fuel and a reformer can be started up quickly by including a portion of fuel cells in the system that operates directly on a starting fluid comprising the unreformed fuel during a start-up period. Thus, within the plurality of fuel cells in the complete system, at least a first portion provides output power during the start-up period. A second portion of the fuel cells in the system, e.g., the remaining fuel cells, operate on reformed hydrogen-containing gas produced by the reformer after the start-up period, and thus provide output power after a start-up period. The first portion of fuel cells are thus "starter cells" for the system.

Typically, the reformer is a part of a more complex fuel processing subsystem which includes means for producing a suitable feedstock (e.g., a mixture of fuel and steam) for the reformer. The feedstock is reformed, and may subsequently be purified and/or humidified, to create a stream of hydrogen-containing gas which is then directed to a second portion of fuel cells at normal operating temperatures. The starting fluid may also be a fuel mixture (e.g., a mixture of fuel and water) but it is not reformed. Instead a starting fluid stream comprising the fuel is directed to the first portion of fuel cells during start-up, and the fuel is oxidized directly at the starter cell anodes in the fuel cell system.

In principle, any fuel can be employed that is suitable for oxidation both directly (unreformed) and indirectly (after reforming). Suitable fuels may be gaseous or liquid and include for example methane, ethers such as dimethyl ether, and alcohols such as methanol. A preferred fuel however is methanol. Aside from being relatively plentiful, inexpensive, and suitable for use as a direct and indirect fuel, methanol and aqueous methanol mixtures have freezing temperatures below that of water.

It can be advantageous to adapt the "starter cells" for operation on the starting fluid stream. In that way, performance during the start-up period is enhanced. Accordingly, the construction and composition of the starter cells (in the first portion) may differ from that of the fuel cells in the second portion. For instance, if the fuel is methanol, it is advantageous to employ an anode electrocatalyst in the first portion of starter cells that is different than the anode electrocatalyst in the second portion of cells. Further, it can be advantageous to employ a membrane electrolyte in the first portion of starter cells that is different than the membrane electrolyte in the second portion of cells.

By adapting the starter cells for direct operation on the starting fluid stream, their performance will be improved on the starting fluid stream but may be worse on the hydrogen-containing gas stream. Nonetheless, after the start-up period is over, it may still be advantageous to direct the hydrogen-containing gas stream to the starter cells (first portion) in order to obtain additional output power therefrom. Alternatively, the starting fluid stream may continue to be directed to the starter cells after the start-up period. In a like manner, even though the second portion of cells may not be adapted for operation on the starting fluid stream, it may still be advantageous to direct the starting fluid stream to the second portion during the start-up period in order to obtain additional output power therefrom. Thus, some or all of the fuel cells may operate initially on the starting fluid stream and then on the reformed hydrogen-containing gas stream.

The first and second portions of the plurality of solid polymer fuel cells may comprise separate fuel cell stacks (i.e., one or more stacks comprising the starter cells and one or more stacks comprising the remaining cells). On the other hand, the first portion of fuel cells may instead be interspersed among the second portion of fuel cells.

During the start-up period, the starter cells may provide enough output power to be useful in heating the reformer, in heating the second portion of fuel cells, and/or in powering a peripheral subsystem (e.g., an air compressor). Compared to starting up all the cells in the system at once, less input energy is required to start only a first portion of them. Then, the starter cells can be used as a source of energy to bootstrap and complete the start-up process.

In preferred embodiments of the method, the start-up period is typically completed when the temperature of a component in the fuel cell system reaches a pre-determined threshold value. Thus, the temperature parameter of the component may be monitored and used to trigger an end to the start-up period of the system. Since the operating temperature of the reformer is generally indicative of its ability to produce a satisfactory reformed fuel stream, its temperature may be used as the trigger in preferred embodiments. Alternatively, the temperature of the second portion of fuel cells may be used as the trigger.

In the preceding, if the characteristics of both the reformer and the fuel cells permit, preferably the starting fluid and the feedstock mixtures would be the same, thus making it possible to store both in a common reservoir.

DETAILED DESCRIPTION OF THE PREFERRED EMBODIMENTS

Figure 1A:
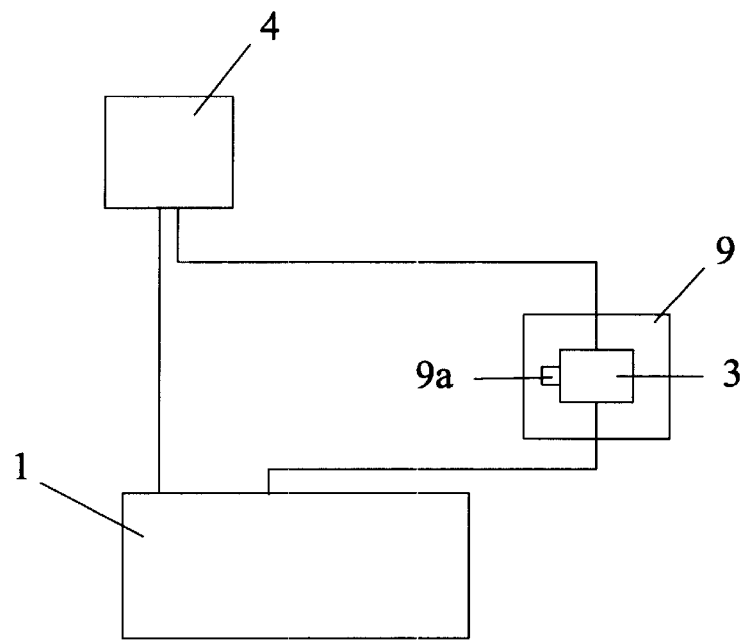
FIG. 1*a* is a schematic diagram of a fuel cell system comprising a fuel supply, a fuel processing subsystem, and a fuel cell stack.
Figure 1B:
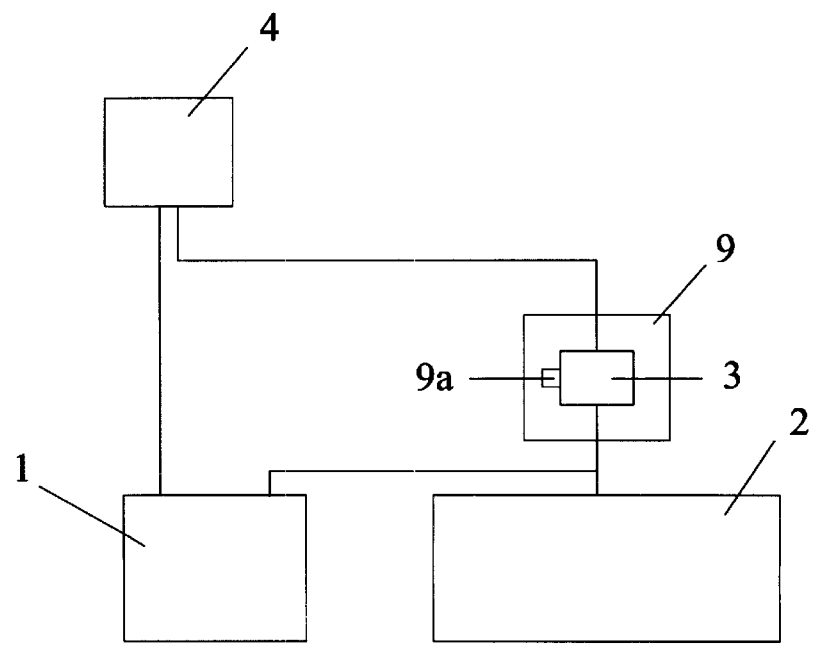
FIG. 1*b* shows the system of FIG. 1*a* in which the fuel cell system comprises a separate "starter" stack.

A schematic diagram of a basic fuel cell system which starts on unreformed fuel and which then operates on reformed fuel is shown in FIG. 1a. Unreformed fuel is first directed to fuel cell stack 1 from fuel supply 4 during a start-up period. After the start-up period, fuel is directed to fuel processing subsystem 9 comprising reformer 3, from which a hydrogen-containing gas is generated. The hydrogen-containing gas is then directed to fuel cell stack 1 instead of the unreformed fuel. FIG. 1b shows a similar schematic diagram except that unreformed fuel is directed to separate starter stack 1 during the start-up period. After the start-up period, hydrogen-containing gas from the fuel processing subsystem 9 is directed to another fuel cell stack 2. Optionally, hydrogen-containing gas from the fuel processing subsystem 9 can also be directed to starter stack 1 after the start-up period is concluded. As depicted, a temperature sensor 9a monitors a temperature parameter in the fuel processing subsystem 9. When a pre-determined threshold value for the temperature parameter is reached, the temperature sensor 9a signals the conclusion of the start-up period.

A preferred fuel cell system with improved starting capability comprises a plurality of solid polymer fuel cells, a supply of methanol fuel, a starting fluid comprising a mixture of methanol fuel and water, and a fuel processing subsystem comprising a reformer. The fuel processing subsystem reforms and processes a feedstock, which also comprises a mixture of methanol fuel and water, to produce a hydrogen-containing gas stream. The starting fluid is directed to the fuel inlet of a first portion of the solid polymer fuel cells. This first portion of fuel cells is adapted for operating on the starting fluid. The feedstock is directed to the inlet of the fuel processing subsystem. The outlet of the fuel processing subsystem is fluidly connected to the fuel inlet of a second portion of the solid polymer fuel cells. The outlet of the fuel processing subsystem is however also fluidly connected to the fuel inlet of the first portion of fuel cells such that the first portion can be operated on the starting fluid during the start-up period and on the hydrogen-containing gas stream after the start-up period. Valves may be used to switch the source of fuel stream supplied to the fuel cells.

Figure 2:
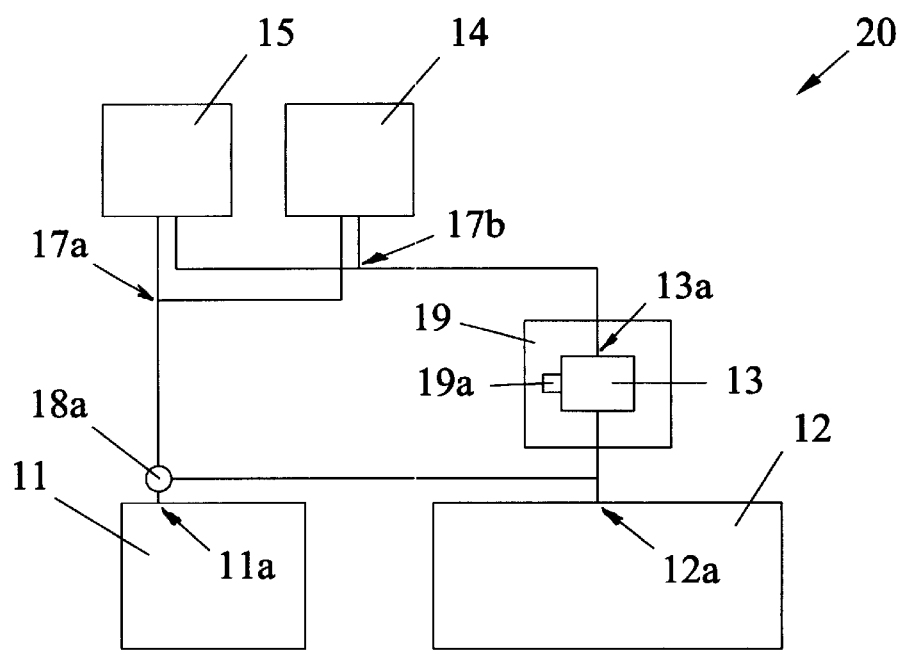
FIG. 2 is a schematic diagram of a first embodiment of a solid polymer fuel cell system comprising a methanol reservoir, a water reservoir, and separate fuel cell stacks adapted for operation on a methanol/water mixture and hydrogen-containing gas respectively.

Several different embodiments of such a methanol fueled system are shown in the following schematic Figures. (For simplicity, various conventional components, such as oxidant supply, compressors, heaters, electrical output terminals, are not shown in these Figures. Such components and their integration in an overall system are disclosed in U.S. Pat. No. 5,200,278, incorporated herein by reference in its entirety.) In FIG. 2, system 20 includes a first fuel cell stack 11 that is adapted for direct operation on methanol. A second fuel cell stack 12 is adapted for operation on reformate provided by reformer 13 in fuel processing subsystem 19. The system includes a methanol reservoir 14 and a water reservoir 15.

During start-up, a starting fluid stream is provided by the controlled mixing of methanol from methanol reservoir 14 and water from water reservoir 15 at junction 17a. The starting fluid is then directed through valve 18a to a fuel inlet 11a of the first fuel cell stack 11. First stack 11 generates electrical power which can be used to heat the reformer 13 or second stack 12, or to power another subsystem. Feedstock for the fuel processing subsystem 19 is provided by a controlled mixing of methanol from methanol reservoir 14 and water from water reservoir 15 at junction 17b. As the system 20 is warming up, feedstock may be directed through the reformer 13 and the fuel processing subsystem output stream may be directed through second stack 12, as is often done conventionally during a fuel system start-up period. However, typically second stack 12 would be under no electrical load during this period. An electrical load would preferably only be applied to second stack 12 once the fuel processing subsystem output stream was acceptable, and perhaps once second stack 12 reached a desirable operating temperature.

When reformer 13 is at a suitable operating temperature as indicated by temperature monitor 19a, feedstock is then directed to reformer inlet 13a. The hydrogen-containing gas output of fuel processing subsystem 19 is then directed to the inlet 12a of the second stack 12. At this point, it may be desirable to stop the flow of starting fluid to first stack 11 and, instead, to direct the hydrogen-containing gas to inlet 11a via valve 18a. Output power may then be obtained from both first and second stacks 11, 12 operating on hydrogen-containing gas from the fuel processing subsystem 19 after start-up.

In part due to methanol crossover issues, conventional direct methanol fuel cells typically operate on methanol/water solutions that have methanol concentrations in the range of from about 1 to 13% by weight. Thus, the starting fluid prepared at junction 17a may have methanol concentrations in that range. The reformer 13 however typically operates on feedstocks with methanol weight concentrations of about 60%. (Stoichiometrically, one mole of methanol is reacted with one mole of water in the reforming reaction. However, an excess of water is typically employed in practice.)

The methanol concentrations in the starting fluid and feedstock provide some protection against freezing (with freezing points of order of −10° C. and −80° C. respectively) in certain areas of the system 20. It may also be possible to use an additive (e.g., ethylene glycol) in the water reservoir 15 to protect it from freezing. However, any additive would have to be compatible with both the fuel cells in first stack 11 and the reformer 13. Also, any additive present should not lead to the production of a hydrogen-containing gas stream which would be incompatible for use in second stack 12. Methanol, of course, is a suitable additive and using an appropriate amount effectively provides a reservoir of starting fluid as shown in the following alternative embodiments.

Figure 3:
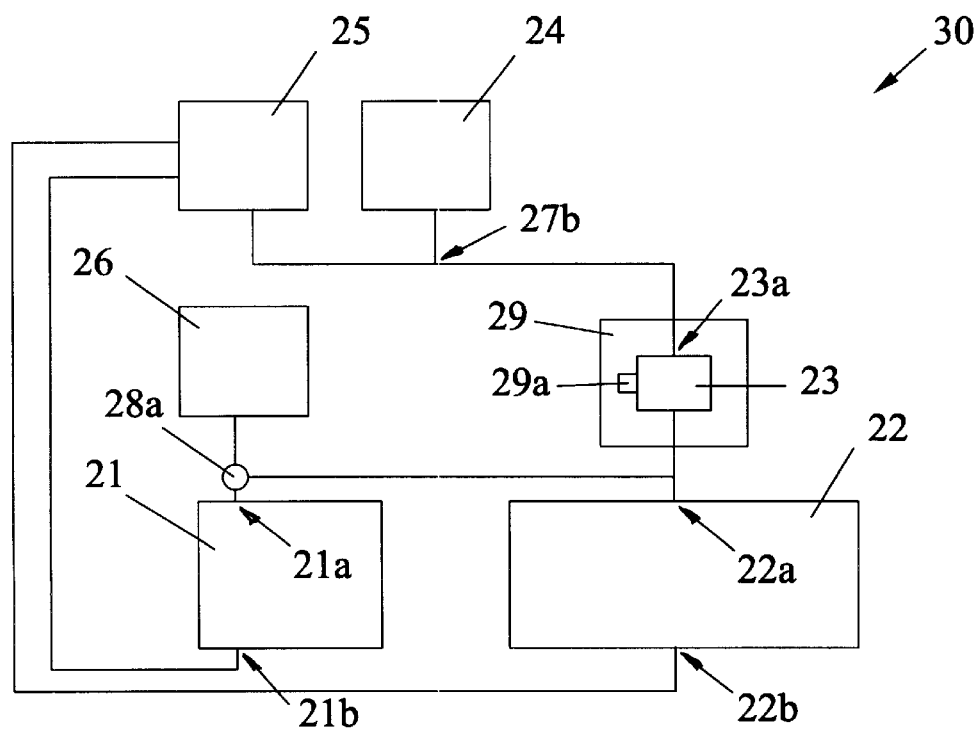
FIG. 3 is a schematic diagram of a second embodiment of a solid polymer fuel cell system comprising methanol, water, and starting fluid reservoirs and separate fuel cell stacks adapted for operation on a methanol/water mixture and hydrogen-containing gas respectively.

FIG. 3 shows another embodiment of a fuel cell system 30 which also includes first and second fuel cell stacks 21, 22, a fuel processing subsystem 29 comprising a reformer 23, and a methanol reservoir 24, each of which is similar in construction and operation to those shown in FIG. 2. However, a starting fluid reservoir 26 comprising a supply of starting fluid is included and a different procedure may be followed with regards to water reservoir 25.

In FIG. 3, during start-up, a starting fluid is provided directly from starting fluid reservoir 26 through valve 28a to fuel inlet 21a of the first fuel cell stack 21. Feedstock for the reformer is provided by the controlled mixing of methanol from methanol reservoir 24 and water from water reservoir 25 at junction 27b. Again, the feedstock is directed to reformer inlet 23a. Here, a supply of water for the water reservoir 25 is obtained from the product water generated by the operating first and/or second fuel cell stacks 21, 22. Thus, water from first stack outlet 21b and second stack outlet 22b is collected and directed into water reservoir 25. At system shutdown, the water reservoir 25 may be emptied so as to avoid freezing. In this embodiment, it may be possible to rely on the production of water from the first stack 21 during start-up to prepare a sufficient amount of aqueous feedstock for the reformer, after which production of water is used from both stacks 21, 22 after start-up.

Figure 4:
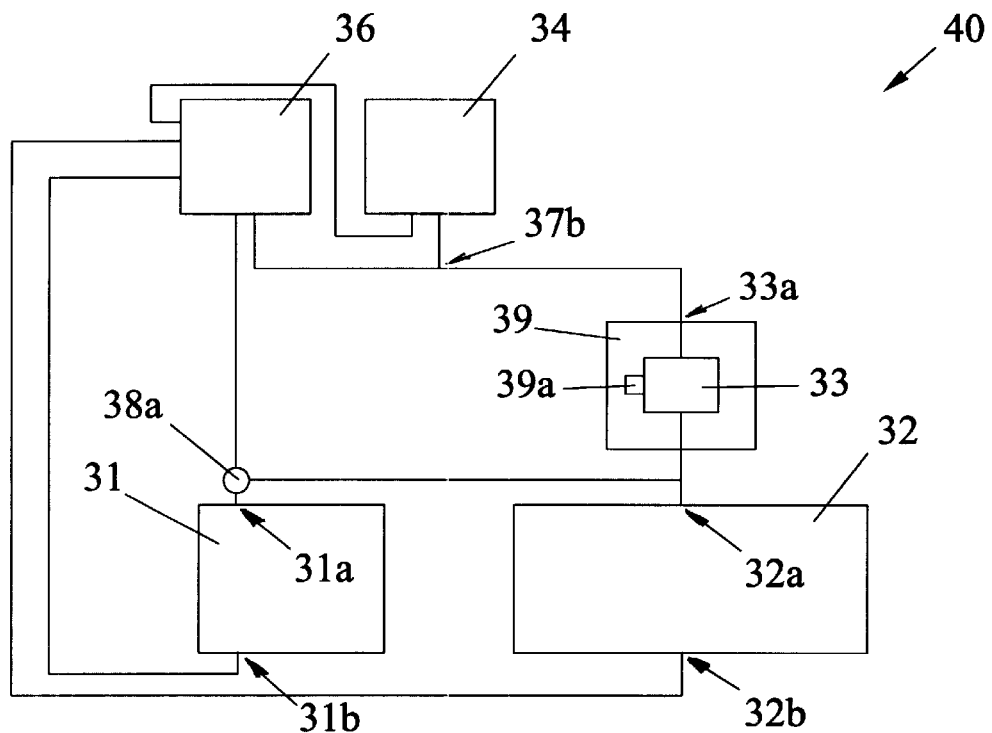
FIG. 4 is a schematic diagram of a third embodiment of a solid polymer fuel cell system comprising a methanol reservoir, a starting fluid reservoir, and separate fuel cell stacks adapted for operation on a methanol/water mixture and hydrogen-containing gas respectively.

FIG. 4 shows still another embodiment of a fuel system 40. As in FIG. 3, system 40 includes first and second fuel cell stacks 31, 32, a fuel processing subsystem 39 comprising a reformer 33, a methanol reservoir 34, a starting fluid reservoir 36, each of which is similar in construction and operation to those shown in FIG. 3. The water reservoir has been omitted.

In FIG. 4, during start-up, a starting fluid is again provided directly from starting fluid reservoir 36 through valve 38a to fuel inlet 31a of the first fuel cell stack 31. Feedstock for the reformer may be provided by the controlled mixing of methanol from methanol reservoir 34 and the starting fluid mixture from starting fluid reservoir 36 at junction 37b. This embodiment is viable in principle as long as the desired concentration of methanol in the feedstock is higher than that in the starting fluid. Starting fluid may be obtained by mixing product water generated by the operating first and/or second fuel cell stacks 31, 32 (coming from first and second stack outlets 31b and 32b respectively) and methanol from methanol reservoir 34. While the embodiment in FIG. 4 requires one less reservoir than that in FIG. 3, the former requires additional material balancing considerations in that the proportions of methanol and water fed to starting fluid reservoir 36 have to be carefully controlled, and be uniformly mixed in the reservoir 36.

Figure 5A:
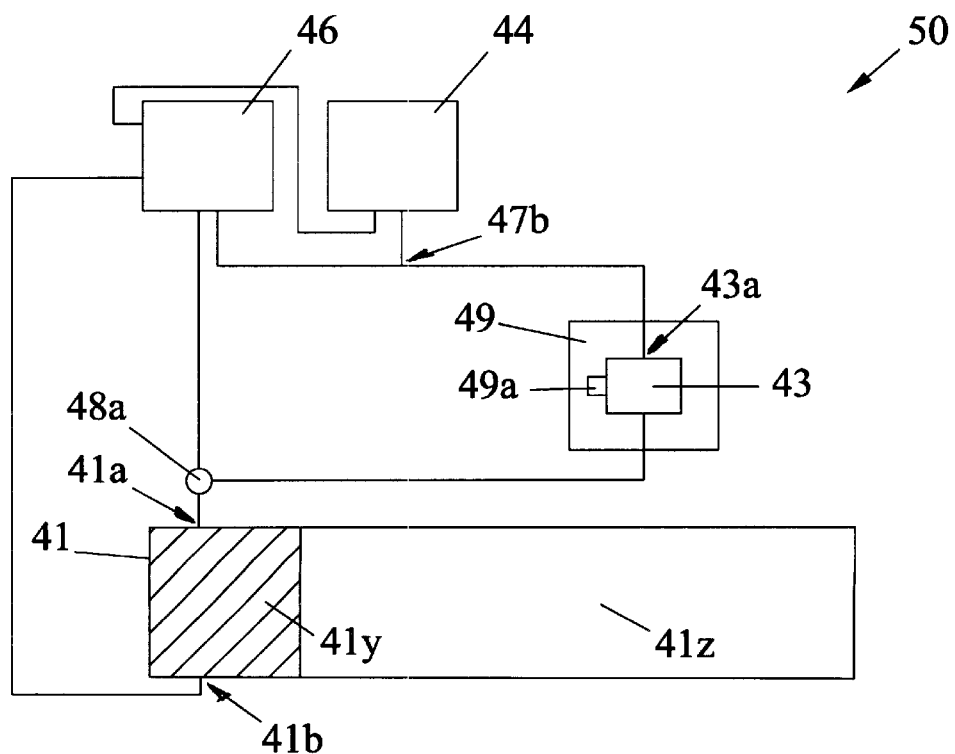
FIG. 5*a* is a schematic diagram of a fourth embodiment of a solid polymer fuel cell system comprising a methanol reservoir, a starting fluid reservoir, and first and second groups of fuel cells in a single stack, but adapted for operation on a methanol/water mixture and hydrogen-containing gas, respectively.
Figure 5B:
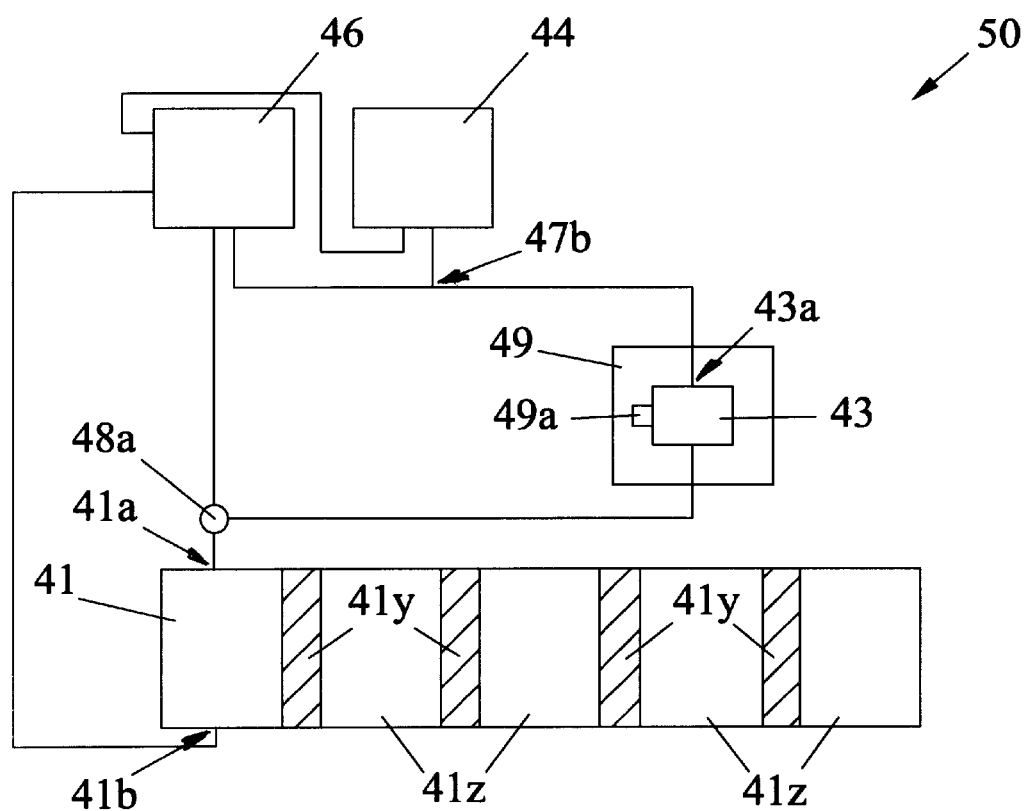
FIG. 5b is a schematic diagram of a fifth embodiment of a solid polymer fuel cell system similar to that of FIG. 5a in which a first group of fuel cells adapted for operation on a liquid methanol/water mixture is interspersed among a second group of cells adapted for operation on hydrogen-containing gas, in a single stack.

A still further embodiment of a fuel cell system 50 is shown in FIG. 5a, which is similar to that of FIG. 4 except that now, an entire fuel cell array 41 is supplied with starting fluid from starting fluid reservoir 46 during start-up through valve 48a to fuel inlet 41a. After start-up, valve 48a is switched to supply hydrogen-containing gas from reformer 43 to fuel inlet 41a instead. As shown in FIG. 4, certain fuel cells in the fuel cell stack, namely, first portion 41y, are adapted for operation on the unreformed starting fluid and the remainder, second portion 41z, are adapted for operation on hydrogen-containing gas. FIG. 5a shows an arrangement where first portion 41y is adjacent to second portion 41z. FIG. 5b shows a similar embodiment except that the fuel cells in first portion 41y are interspersed among the fuel cells in the second portion 41z in stack 41. Note however that it may not be desirable for any fuel cells to be adapted for operation on starting fluid in these embodiments because the output power from the entire array operating on the starting fluid may be sufficient for start-up purposes without any special modification of any fuel cells. An advantage of these embodiments generally is that separate manifolding and electrical connections to each fuel cell portion are not required. Another advantage is that the integration of the fuel cell portions in a single stack promotes efficient heat transfer during the warm-up period (particularly in the embodiment shown in FIG. 6). However, all the cells in the fuel cell stack must undergo a transition between fuel supplies at the end of the start-up period in these embodiments.

If starting fluid mixtures of high enough methanol concentration can be used successfully, the composition of the starting fluid mixture and the feedstock mixture can be made the same. In that case, a further simplification of the above apparatus is possible in principle (e.g., a single reservoir 34 could be used).

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method of commencing operation of a fuel cell system, said system comprising a plurality of solid polymer fuel cells, a supply of fuel, and a fuel processing subsystem comprising a reformer which processes a feedstock comprising said fuel to produce a hydrogen-containing gas stream, said method comprising:

directing a starting fluid stream comprising said fuel to at least a first portion of said plurality of solid polymer fuel cells during a start-up period, whereby said first portion provides output power during said start-up period; and directing said hydrogen-containing gas stream from said fuel processing subsystem to at least a second portion of said plurality of solid polymer fuel cells after said start-up period, whereby said second portion provides output power after said start-up period.

2. The method of claim 1 wherein said first portion of said plurality of solid polymer fuel cells is adapted for operation on said starting fluid stream.

3. The method of claim 2 wherein said first portion of said plurality of solid polymer fuel cells comprises an anode electrocatalyst that is different than the anode electrocatalyst of said second portion of solid polymer fuel cells.

4. The method of claim 2 wherein said first portion of said plurality of solid polymer fuel cells comprises a membrane electrolyte that is different than the membrane electrolyte of said second portion of solid polymer fuel cells.

5. The method of claim 1 further comprising directing said hydrogen-containing gas stream to said first portion of said plurality of solid polymer fuel cells after said start-up period, whereby said first portion provides output power after said start-up period.

6. The method of claim 2 further comprising directing said starting fluid stream to said first portion of said plurality of solid polymer fuel cells after said start-up period whereby said first portion provides output power after said start-up period.

7. The method of claim 1 further comprising directing said starting fluid stream to said second portion of said plurality of solid polymer fuel cells during said start-up period, and directing said hydrogen-containing gas stream to said first portion of said plurality of solid polymer fuel cells after said start-up period.

8. The method of claim 6 wherein said first portion of said plurality of solid polymer fuel cells is interspersed among said second portion of said plurality of solid polymer fuel cells.

9. The method of claim 6 wherein said first portion of said plurality of solid polymer fuel cells and said second portion of said plurality of solid polymer fuel cells are located in separate fuel cell stacks in said fuel cell system.

10. The method of claim 1 wherein said fuel is a liquid.

11. The method of claim 10 wherein the freezing point of said starting fluid stream is lower than that of water.

12. The method of claim 10 wherein said fuel comprises methanol.

13. The method of claim 12 wherein said starting fluid stream comprises a mixture of methanol and water.

14. The method of claim 1 wherein said fuel comprises dimethyl ether.

15. The method of claim 1 further comprising heating said reformer using said output power of said first portion of said plurality of solid polymer fuel cells during said start-up period.

16. The method of claim 1 further comprising heating said second portion of said plurality of solid polymer fuel cells using said output power of said first portion of said plurality of solid polymer fuel cells during said start-up period.

17. The method of claim 1 further comprising powering a peripheral subsystem using said output power of said first portion of said plurality of solid polymer fuel cells during said start-up period.

18. The method of claim 1 further comprising monitoring a temperature parameter in said fuel cell system and concluding said start-up period when said temperature parameter reaches a pre-determined threshold value.

19. The method of claim 18 wherein said temperature parameter is the operating temperature of said reformer in said fuel processing subsystem.

20. The method of claim 18 wherein said temperature parameter is the temperature of said second portion of said plurality of solid polymer fuel cells.

21. The method of claim 13 further comprising:
providing a methanol reservoir in said fuel cell system;
providing a water reservoir in said fuel cell system;
using methanol from said methanol reservoir and water from said water reservoir in said starting fluid stream; and
using methanol from said methanol reservoir and water from said water reservoir in said feedstock for said reformer.

22. The method of claim 13 further comprising:
providing a methanol reservoir in said fuel cell system;
providing a water reservoir in said fuel cell system;
directing product water from said plurality of solid polymer fuel cells to said water reservoir;
providing a starting fluid reservoir in said fuel cell system;
using said starting fluid reservoir to store said starting fluid; and
using methanol from said methanol reservoir and water from said water reservoir in said feedstock for said reformer.

23. The method of claim 13 further comprising:
providing a methanol reservoir in said fuel cell system;
providing a starting fluid reservoir in said fuel cell system;
directing methanol from said methanol reservoir and directing product water from said plurality of solid polymer fuel cells to said starting fluid reservoir;
directing said starting fluid from said starting fluid reservoir to said first portion of said plurality of solid polymer fuel cells; and using methanol from said methanol reservoir and said starting fluid from said starting fluid reservoir in said feedstock for said reformer.

24. The method of claim 23 wherein the method further comprises:
directing said starting fluid stream to said plurality of solid polymer fuel cells during said start-up period, whereby said plurality of solid polymer fuel cells provides output power during said start-up period; and
directing said hydrogen-containing gas stream to said plurality of solid polymer fuel cells after said start-up period, whereby said plurality of solid polymer fuel cells provides output power after said start-up.

25. The method of claim 24 wherein said first portion of said plurality of solid polymer fuel cells are adapted for operating on said starting fluid stream.

26. The method of claim 25 wherein said first portion of said plurality of solid polymer fuel cells is interspersed among said second portion of said plurality of solid polymer fuel cells.

27. The method of claim 13 wherein said starting fluid for said starting fluid stream and said feedstock for said reformer are the same and are stored in a common fuel reservoir.

28. A fuel cell system with improved starting capability comprising:
a plurality of solid polymer fuel cells; and
a supply of fuel; and
a fuel processing subsystem comprising a reformer for processing a feedstock comprising said fuel to produce a hydrogen-containing gas stream, said fuel processing subsystem fluidly connected to receive fuel from said fuel supply;
wherein at least a first portion of said plurality of solid polymer fuel cells is fluidly connected to receive said fuel from said fuel supply, and at least a second portion of said plurality of solid polymer fuel cells is fluidly connected to receive said hydrogen-containing gas stream from said fuel processing subsystem.

29. The fuel cell system of claim 28 wherein said first portion of said plurality of solid polymer fuel cells is adapted for operating on a starting fluid comprising said fuel.

30. The fuel cell system of claim 29 wherein said first portion of said plurality of solid polymer fuel cells comprises an anode electrocatalyst that is different than the anode electrocatalyst of said second portion of solid polymer fuel cells.

31. The fuel cell system of claim 29 wherein said first portion of said plurality of solid polymer fuel cells comprises a membrane electrolyte that is different than the membrane electrolyte of said second portion of solid polymer fuel cells.

32. The fuel cell system of claim 29 wherein said first portion of said plurality of solid polymer fuel cells is interchangeably fluidly connected to receive said hydrogen-containing gas from said fuel processing subsystem.

33. The fuel cell system of claim 28 wherein said fuel comprises methanol.

34. A method of operating a fuel cell system, said system comprising a plurality of solid polymer fuel cells and a reformer for processing a feedstock to produce a fuel stream containing hydrogen gas, said method comprising:
directing a an unreformed starting fluid stream to said plurality of fuel cells during a start-up period whereby at least some of said fuel cells provide output power during said start-up period; and
directing said fuel stream containing hydrogen gas from said reformer to said plurality of fuel cells after said start-up period, whereby at least some of said fuel cells provide output power after said start-up period.

35. The method of claim 34 wherein said starting fluid stream comprises unreformed feedstock.

36. A fuel cell system comprising:
a plurality of solid polymer fuel cells;
a fuel processing subsystem comprising a reformer for processing an unreformed fuel to produce a reformed fuel, and said fuel processing subsystem is fluidly connected to provide said reformed fuel to said plurality of fuel cells;
wherein at least some of said plurality of fuel cells start on said unreformed fuel and at least some of said plurality of fuel cells operate on said reformed fuel.

37. The fuel cell system of claim 36 wherein at least some of said plurality of solid polymer fuel cells are adapted for operation on a fuel selected from the group consisting of methane, ethers, alcohols, and mixtures thereof.

38. The fuel cell system of claim 37 wherein said fuel is mixed with water.

* * * * *